No. 770,294. PATENTED SEPT. 20, 1904.
T. A. KILLMAN.
WEIGHING AND COMPUTING SCALE.
APPLICATION FILED OCT. 24, 1903.
NO MODEL. 3 SHEETS—SHEET 1.
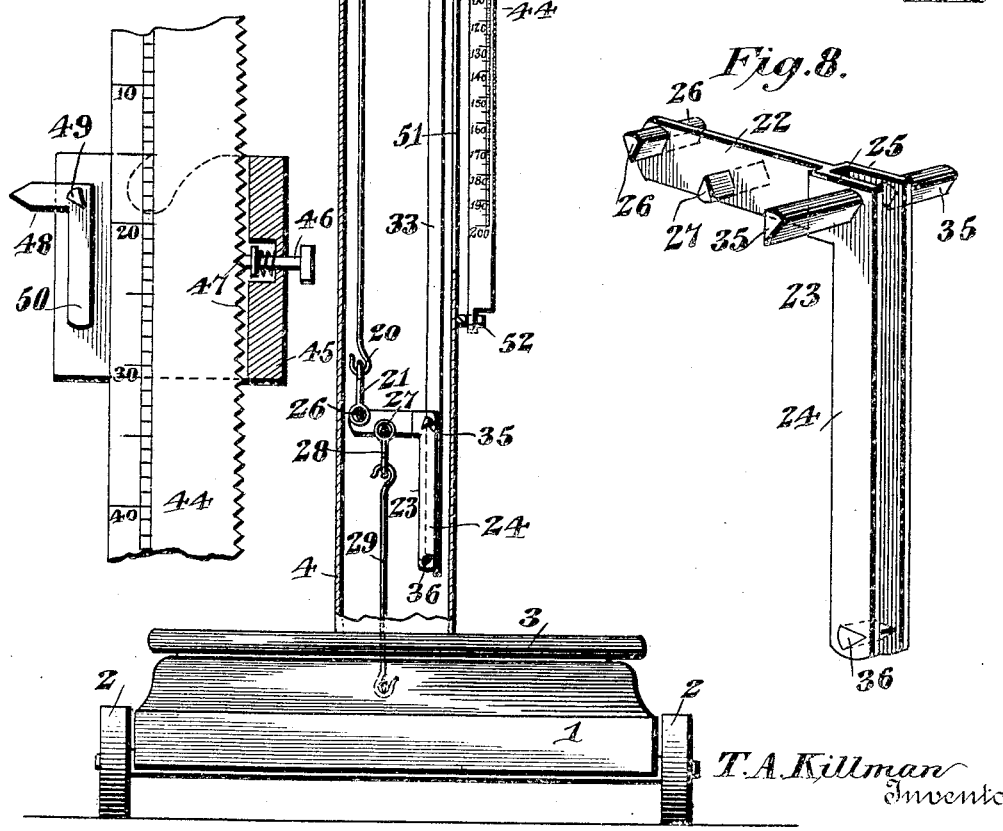
Fig. 1.
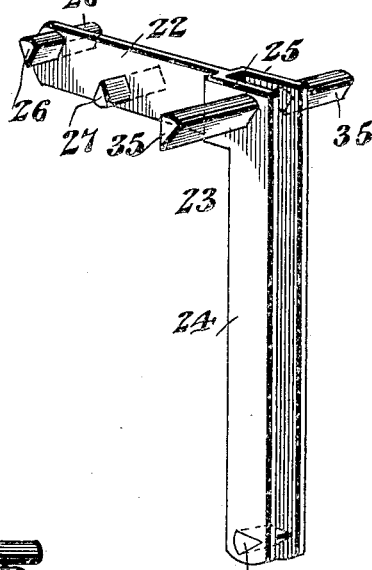
Fig. 8.
Fig. 9.
T. A. Killman, Inventor
Witnesses
Jas. F. McCathran
N. F. Riley
By E. G. Siggers
Attorney No. 770,294. PATENTED SEPT. 20, 1904.
T. A. KILLMAN.
WEIGHING AND COMPUTING SCALE.
APPLICATION FILED OCT. 24, 1903.
NO MODEL. 3 SHEETS—SHEET 2.
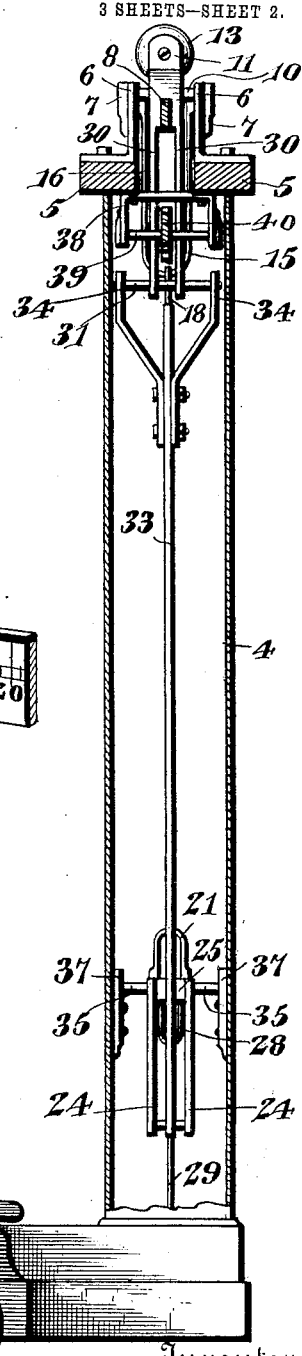
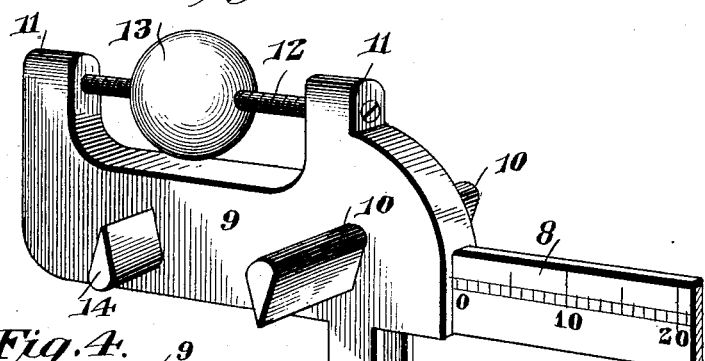
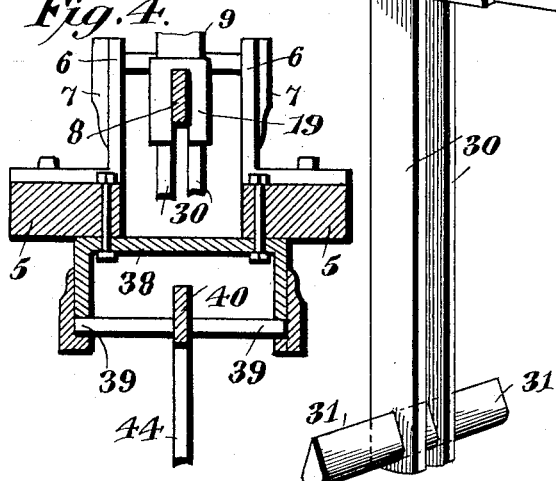
Witnesses
Jas. K. McCathran
H. F. Riley
Inventor
T. A. Killman
By C. G. Siggers
Attorney No. 770,294. PATENTED SEPT. 20, 1904.
T. A. KILLMAN.
WEIGHING AND COMPUTING SCALE.
APPLICATION FILED OCT. 24, 1903.
NO MODEL. 3 SHEETS—SHEET 3.
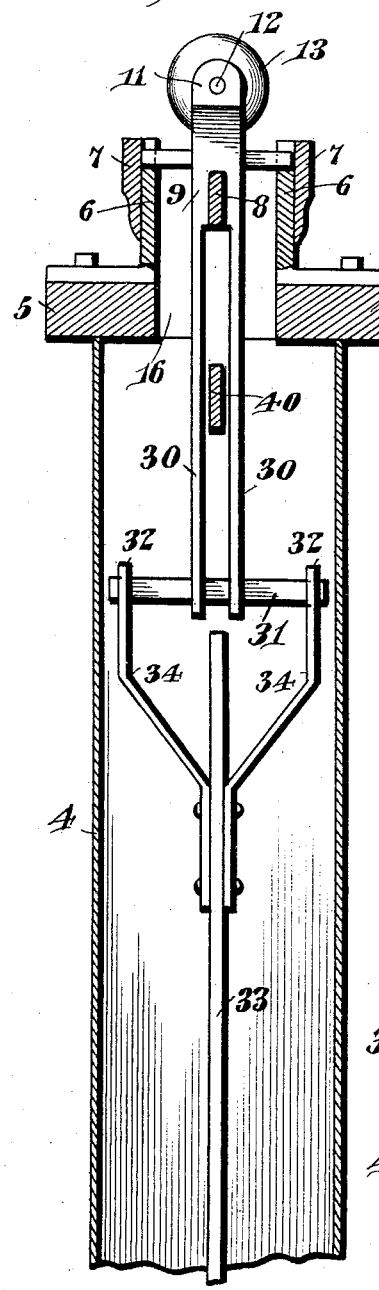
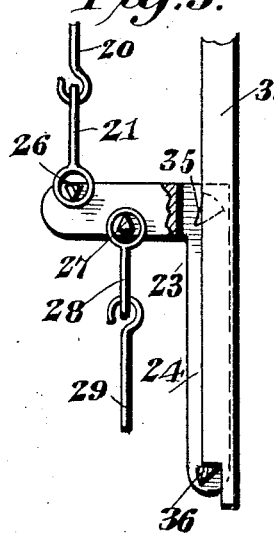
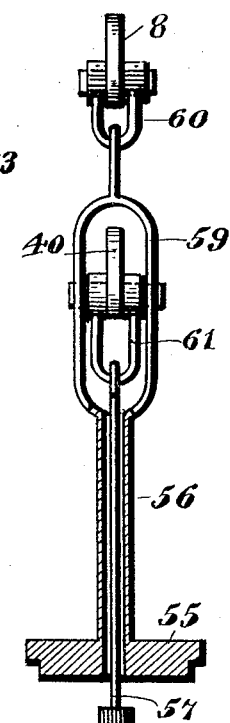
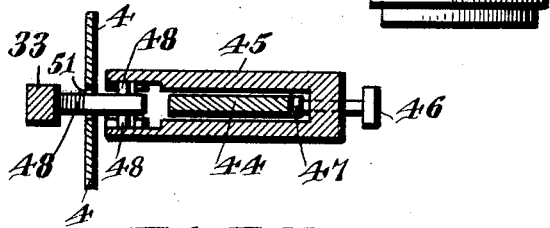
T. A. Killman, Inventor
Witnesses No. 770,294.

Patented September 20, 1904.

UNITED STATES PATENT OFFICE.

THOMAS ANDREW KILLMAN, OF LIBERTY, TENNESSEE.

WEIGHING AND COMPUTING SCALE.

SPECIFICATION forming part of Letters Patent No. 770,294, dated September 20, 1904.

Application filed October 24, 1903. Serial No. 178,415. (No model.)

*To all whom it may concern:*

Be it known that I, THOMAS ANDREW KILLMAN, a citizen of the United States, residing at Liberty, in the county of Dekalb and State of Tennessee, have invented a new and useful Weighing and Computing Scale, of which the following is a specification.

The invention relates to improvements in weighing and computing scales.

The object of the present invention is to improve the construction of weighing and computing scales and to provide a simple, inexpensive, and efficient one adapted to be employed for ordinary weighing purposes and for indicating the weight in pounds or any other unit of measure and capable also of enabling the price of the goods or material to be readily ascertained when the price or unit of price is a multiple of the unit of measurement of the weighing portion of the scale.

A further object of the invention is to provide a scale of this character designed particularly for use in flour-mills and other places where different grades of the same material are bought and sold and to enable the weight of a quantity of such material in pounds and price in bushels or any other units of measurement to be quickly and accurately ascertained.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a front elevation, partly in section, of a weighing and computing scale constructed in accordance with this invention. Fig. 2 is a side elevation partly in section. Fig. 3 is an enlarged vertical sectional view on the line 3 3 of Fig. 1. Fig. 4 is an enlarged vertical sectional view on the line 4 4 of Fig. 1. Fig. 5 is an enlarged detail sectional view of the lower portion of the scale, illustrating the construction of the perpendicular vibratory connecting-bar and the bell-crank lever. Fig. 6 is a detail sectional view illustrating the arrangement of the pendants for supporting the counterweights of the weighing and computing or calculator beams. Fig. 7 is a detail perspective view of a portion of the weighing-beam. Fig. 8 is a detail view of the bell-crank lever. Fig. 9 is a detail sectional view illustrating the manner of mounting the slidable price-block on the depending arm or graduated member of the calculator or computing beam. Fig. 10 is a horizontal sectional view of the same.

Like numerals of reference designate corresponding parts in all the figures of the drawings.

1 designates the base of a platform-scale, which base may be of any desired construction and which is preferably provided with suitable wheels 2 for enabling it to be conveniently moved. The base has mounted upon it a platform 3, which is supported in the usual manner by platform-levers. (Not shown.) Any preferred arrangement of platform-levers may be employed, and as this does not constitute any portion of the present invention a detail description and illustration is deemed unnecessary. Rising from one end of the base is a hollow post 4, at the upper end of which is mounted a horizontal bar 5, and secured to the latter are brackets 6, provided with bearings 7 for a weighing-beam 8. The brackets are approximately L-shaped, being provided with horizontal portions, which are bolted or otherwise secured to the upper face of the horizontal bar 5. The weighing-beam 8 has an enlarged rear end portion 9, as clearly illustrated in Fig. 7 of the drawings, and it is provided at opposite sides thereof with knife-edge pivots 10, which are arranged in the bearings 7 of the brackets 6. The knife-edge pivots 10, which project laterally from the inner portion of the weighing-beam, are tapered toward their lower edges, which support the beam 8. The inner portion or arm 9 of the weighing-beam is provided with upright projections 11, forming supports for a horizontal screw 12, located above and extending longitudinally of the weighing-beam and receiving an adjustable counterpoise 13, which is preferably in the form of a ball, as shown; but it may be of any other configuration, as will be readily understood. The counterbalancing-weight is adapted to be readily adjusted to correct any inaccuracy of the scale, so that the latter may be properly balanced.

The weighing-beam is also provided at its inner or rear arm 9 with knife-edge pivots 14, extending laterally from opposite sides of the weighing-beam and tapered toward their upper edges to receive the sides of a link 15, which is approximately U-shaped and which is provided at the upper terminals of its sides with bearing eyes or rings for the reception of the pivots 14. The U-shaped link 15 extends through an aperture or slot 16 of the rear portion of the horizontal bar 5, and its lower end supports the upper terminal of a connecting-rod 17, which is provided at its upper end with a hook 18 for engaging the link. The lower end of the rod 17 is connected, by means hereinafter described, with the platform of the scale. The weighing-beam 8 is also provided with a slidable poise 19, and it has suitable graduations and numbers for indicating the weight in pounds or any other unit of measurement. The weighing-beam is used for weighing in the same manner as that of an ordinary pair of platform-scales, and when a quantity of goods or material or any other object having weight is placed upon the platform of the scale motion will be communicated through the upright connections to the inner or rear arm of the weighing-beam, and the latter may be brought to a balance by sliding the poise 19 outward from the position indicated in Fig. 1 of the drawings.

The upright connecting-rod 17 is provided at its lower end with a hook 20 for engaging a link 21, which connects the rod 17 with the outer end of an approximately horizontal arm 22 of a bell-crank lever 23, which is also provided with a pair of upright bars or sides 24, constituting the upright arm of the bell-crank lever and connected at their upper ends with the inner terminal of the horizontal arm 22 by offset portions 25, which space the sides 24 apart for a purpose hereinafter explained. The outer end of the horizontal arm 22 is provided with knife-edge pivots 26 for engaging eyes or rings at the lower ends of the sides of the link 21. The arm 22 is also provided at a point between its ends with knife-edge pivots 27, which are connected by a link 28 with a lower rod 29, and the latter extends to the base of the scale and is connected with the platform in the usual manner.

The weighing-beam is provided with a pair of rigid supporting-arms 30, formed integral with the weighing-beam or otherwise fixed to the same and arranged in the same vertical plane as the knife-edge pivots 10. The arms 30 support a knife-edge pivot-bar 31, which extends through both of the arms, at the lower terminals thereof, forming a pair of laterally-extending pivots. The laterally-extending portions of the pivoted bar 31 receive the upper ends 32 of a pair of diverging arms 34 of an upright connecting-bar 33. The diverging arms 34, which are provided at their upper ends 32 with open eyes or hooks, preferably consist of straps or bars bolted or otherwise secured to the connecting-bar 33 and extending above the same. The arms 30 are spaced apart to receive the upper end of the connecting-bar 33, and the lower end of the latter is arranged between the sides 24 of the upright arm of the bell-crank lever 23. The bell-crank lever 23 is fulcrumed at its angle by knife-edge pivots 35 and is provided at the lower terminals of the sides 24 of the upright arm with a pivot 36, consisting of a knife-edge bar or piece and adapted to bear against the lower end of the perpendicular connecting-bar 33. The knife-edge pivots 35, which support the bell-crank lever, are arranged in suitable bearings 37, located at opposite sides of the hollow post and suitably secured to the same.

Depending from the horizontal bar 5 is a bracket or hanger 38 of inverted-U shape, having depending vertical sides and provided with bearing-recesses for the reception of knife-edge pivots 39, which support a calculator or computing beam 40. The calculator or computing beam 40, which is located in the same vertical plane as the weighing-beam 8, is fulcrumed between its ends, and its rear portion is provided with an aperture 41, in which is arranged a counterbalancing-weight 42, and the latter is supported by a screw 43 and is adapted to be adjusted to correct any inaccuracy of the scale. The calculator or computing beam is provided with a rigid depending arm 44, forming a lever for communicating pressure to the upright or perpendicular connecting-bar 33 and for being actuated by the same. The arm 44 is provided with graduations and numbers for indicating the price per bushel or other unit of measurement, and a slidable price-block 45 is mounted on the depending graduated arm or member 44 and is provided with means for engaging the bar or member 33. The slidable price-block is provided with an approximately vertical aperture to receive the graduated bar or arm 44, and it has a spring-actuated pin or bolt 46 for engaging notches 47, formed in the outer edge of the bar or arm 44; but any other suitable means may be provided for locking the price-block at the desired adjustment. The inner edge of the price-block is slotted to receive a pivotally-mounted automatically-adjustable fulcrum-piece 48, which is approximately L-shaped and which is fulcrumed at its angle by knife-edge pivots 49. The engaging arm of the fulcrum 48 is disposed horizontally, and the upright arm 50 operates as a weight for maintaining the engaging arm normally in a horizontal position. The pivotally-mounted fulcrum permits the parts to oscillate in balancing the scale without liability of binding thereby affecting the accuracy of the scale. The projecting portion of the fulcrum 48 extends through a slot 51 of the hollow post and bears against the adjacent edge of the bar or member 33. The lower end of the arm or bar 44 is reduced and is arranged in an opening of a guide 52, which extends horizontally from the hollow post a short distance below the slot 51.

The calculator or computing beam is provided with graduations and numbers and has a sliding poise 53, and the counterbalancing effect of the latter is varied by moving the price-block upward and downward, the downward movement of the price-block decreasing the counterbalancing power of the slidable poise 53 and requiring the latter to be moved outward a greater distance to counterbalance the scale. The graduations of the arm or bar 44 gradually increase from the upper end of the same, and the numbers of the calculator or computing beam increase from the inner end thereof, so that as the price increases the sliding poise 53 must be moved a greater distance to effect a counterbalancing of the scale.

The weighing and the calculator or computing beams are guided at their outer ends by a vertical bar or piece 54, secured to the outer end of the horizontal bar 5 and extending above and below the same and provided with upper and lower guide-slots or bifurcations. Each of the beams is provided with a pendant or weight-receiving hanger, and in order to enable the beams to be arranged in the same vertical plane the pendant or hanger 55 is provided with a tubular rod or shank 56, through which the rod 57 of the pendant or hanger 58 of the calculator or computing beam passes. The pendant or hanger 55 is also provided with a substantially oval portion 59, composed of two sides which are spaced apart to receive the outer portion of the computing or calculator beam. The beams are provided with depending links 60 and 61 to receive the upper ends of the rods or stems of the weight-receiving hangers or pendants, the said rods or stems being provided at their upper ends with hooks for engaging the links. By this construction the pendants or weight-receiving hangers are adapted to be readily detached when desired. The weight-receiving hangers or pendants are preferably graduated and provided with numbers, as shown, for readily indicating the amount of weight applied to them.

The computing and weighing scale is simple and comparatively inexpensive in construction. It is adapted to be operated for weighing purposes as readily as an ordinary platform-scale. After the weight of a quantity of goods or material has been ascertained by bringing the weighing-beam to a balance the value of the goods may be obtained by bringing the computing-beam to a balance. Prior to balancing the computing-beam the sliding poise of the weighing-beam is moved to the inner end of the graduated arm. The computing mechanism is simple, strong, and durable, and it is positive, reliable, and active and is not liable to get out of order. The capacity of the computing mechanism may be readily varied by varying the length of the hollow post and the consequent length of the perpendicular laterally-movable bar or member 33, as a unit of pressure applied to the bar or member 33 at any point throughout the length of the same will have the same effect, owing to the uniform length of the upright arms of the weighing-beam and the angle or bell-crank lever. The scale may be employed for a variety of purposes and for use in various kinds of business, and the graduations of the computing or calculator beam and the price bar or arm may be varied to adapt the scale to the character of calculations desired.

The weighing mechanism comprises, essentially, the weighing-beam, the platform or receptacle for the goods to be weighed, and the connections between the same. The computing mechanism comprises the computing-beam, the depending arm or price-bar, which is provided with a vertically-adjustable price-indicating device, and means for communicating pressure from the price-indicating device to the connections between the weighing-beam and the platform or receptacle. The weighing mechanism and the computing mechanism are operable independently of each other—that is to say, the goods are first weighed, the weight being ascertained by the poise of the weighing-beam. After the weight has been obtained the movable poise of the weighing-beam is returned to zero, and then the price of the goods is obtained by means of the movable price-indicating device of the arm or price-bar and the movable poise of the computing-beam. The goods may be weighed without ascertaining the price, and the price of the goods may be ascertained without weighing the same.

Having thus fully described my invention, what I claim as new, and desire to secure by Letters Patent, is—

1. In a scale of the class described, the combination with weighing mechanism, of computing mechanism having a substantially vertical oscillatory price member, and means for communicating pressure from the price member to the weighing mechanism, substantially as described.

2. In a scale of the class described, the combination with a weighing-beam, a receptacle for the goods to be weighed, and connections between the weighing-beam and the receptacle, of a computing-beam having an arm arranged at an angle to the computing-beam and extending in the same direction as the connections between the weighing-beam and the receptacle, and a movable price-indicating device mounted on the arm and arranged to engage the said connections, substantially as described.

3. In a scale of the class described, the combination with weighing mechanism, of a computing-beam having an approximately vertical angularly-disposed price member, and a movable device carried by the price member for communicating pressure to the weighing mechanism, substantially as described.

4. In a scale of the class described, the combination with weighing mechanism, of independently-operable computing mechanism provided with a price-indicating device movable upward and downward and means for communicating pressure from the price-indicating device to the weighing mechanism, substantially as described.

5. In a scale of the class described, the combination with weighing mechanism, of a computing-beam provided with an approximately vertical price member, a price-indicating device movable on the member, and means disposed longitudinally of the price member and engaged by the price-indicating device for communicating pressure to the weighing mechanism, substantially as described.

6. In a scale of the class described, the combination of a weighing-beam, a receptacle for the goods to be weighed, and connections between the weighing-beam and the receptacle, of a bar suspended from the weighing-beam and engaging the said connections, a computing-beam provided with an arm extending from it at an angle and arranged in substantial parallelism with the bar, and a movable price-indicating device mounted on the arm and engaging the bar, substantially as described.

7. In a scale of the class described, the combination with a weighing-beam, a receptacle for the goods to be weighed, connections between the same, a computing-beam having an angularly-disposed price-arm, and means for communicating pressure from the price-arm to the said connections, substantially as described.

8. In a scale of the class described, the combination with weighing mechanism, of a substantially vertical movable member connected with the weighing mechanism, a computing-beam provided with a price member, and a device movable longitudinally of the price member for engaging the movable member, substantially as described.

9. In a scale of the class described, the combination with a weighing-beam, a receptacle for the goods to be weighed, and connections between the weighing-beam and the receptacle, of a computing-beam having a price-arm arranged in substantial parallelism with the said connections, and a movable price-indicating device mounted on the arm and engaging the connections between the weighing-beam and the receptacle, substantially as described.

10. In a scale of the class described, the combination with weighing mechanism, of a movable member connected with the same for communicating pressure thereto, a computing-beam provided with a price-arm, and a movable device carried by the price-arm and having an automatic gravity-fulcrum for engaging the movable member, substantially as described.

11. In a scale of the class described, the combination with weighing mechanism having a weighing-beam, of a computing-beam having an angularly-disposed price-arm, a movable price-indicating device carried by the arm, and a movable member disposed longitudinally of the price-arm and connected with the weighing mechanism and arranged to be engaged by the price-indicating device, substantially as described.

12. In a scale of the class described, the combination of weighing mechanism, provided with upper and lower arms of uniform length movable with the weighing mechanism, a movable member connecting and coöperating with the arms for communicating pressure to the weighing mechanism, and computing mechanism provided with means for engaging the said member, substantially as described.

13. In a scale of the class described, the combination of weighing mechanism provided with upper and lower arms of uniform length, a movable member connecting and coöperating with the arms, and computing mechanism having an adjustable price-indicating device for engaging the said member, substantially as described.

14. In a scale of the class described, the combination with a movable member, of weighing mechanism provided with upper and lower oscillatory arms coöperating with and supporting the movable member, a receptacle for the goods to be weighed connected with the arms, and computing mechanism provided with a movable price-indicating device for engaging the said movable member, substantially as described.

15. In a scale of the class described, the combination of a movable member, weighing mechanism provided with upper and lower oscillatory supports receiving the movable member, and computing mechanism having an adjustable price-indicating device for engaging the movable member, substantially as described.

16. In a scale of the class described, the combination of a movable member, weighing mechanism provided with upper and lower oscillatory supports coöperating with the movable member, and computing mechanism provided with a price-arm arranged in substantial parallelism with the movable member and provided with a movable price-indicating device for engaging the same, substantially as described.

17. In a scale of the class described, the combination of weighing mechanism provided with substantially vertical oscillatory arms, a movable member connecting and supported by the arms, a computing-beam provided with an upright price-arm, and a movable price-indicating device carried by the price-arm for engaging the movable member, substantially as described.

18. In a scale of the class described, the combination with an approximately vertical movable member, of a movable price-indicating device for coöperating with the member, and an approximately horizontal pivoted fulcrum carried by the price-indicating device and engaging the said member and provided with a weighted arm for maintaining it in operative position, substantially as described.

19. In a scale of the class described, the combination of an upright movable member, a substantially vertical price-bar, a price-block slidable on the bar and provided with means for securing it in its adjusted position, and a pivoted fulcrum mounted on the price-block and provided with a depending weighted arm, substantially as described.

20. In a scale of the class described, the combination of a weighing-beam having a fixed depending arm, means for connecting the weighing-beam with a receptacle for the goods to be weighed, said means being also provided with a depending arm, a movable member connecting the said arms, and computing mechanism coöperating with the movable member and provided with means for engaging the same, substantially as described.

21. In a scale of the class described, the combination of a weighing-beam having an angularly-disposed arm, means for connecting the weighing-beam with the receptacle for the goods to be weighed, said means being provided with an arm, a movable member connecting the said arms, and computing mechanism provided with means for engaging the said member, substantially as described.

22. In a scale of the class described, the combination of a weighing-beam having an arm depending therefrom, means for connecting the weighing-beam with a receptacle for the goods to be weighed, said means being provided with a lever having an arm coöperating with the arm of the weighing-beam, a movable member connecting the said arms, and computing mechanism provided with means for engaging the movable member, substantially as described.

23. In a scale of the class described, the combination of a weighing-beam having a depending arm, an angle-lever also having a depending arm, means for connecting the angle-lever with the weighing-beam and with a receptacle, a movable member connecting the said arms, and computing mechanism provided with means for engaging the said member, substantially as described.

24. In a scale of the class described, the combination of a weighing-beam having depending arms, a bell-crank lever connected with the weighing-beam, a movable member suspended from the arms of the weighing-beam and engaging the bell-crank lever, a computing-beam having a depending price-arm, and a movable price-indicating device carried by the price-arm for engaging the said member, substantially as described.

25. In a scale of the class described, the combination of a base, a platform, a hollow post rising from the base and having a slot, a weighing-beam located at the top of the post and provided with an arm, a lever located within the post and connected with the weighing-beam and the platform, a movable member supported by the arm of the weighing-beam and engaging the said lever, and a computing-beam provided with a depending price-arm located adjacent to the post and provided with a movable price-indicating device extending through the slot of the post and engaging the movable member, substantially as described.

26. In a scale of the class described, the combination of upper and lower beams, and weight-receiving hangers connected with the beams, one of the hangers being provided with an opening or passage for the other, substantially as described.

27. In a scale of the class described, the combination of upper and lower beams, a weight-receiving hanger or pendant connected with the upper beam and provided with a vertical opening and having an open-slotted frame to receive the lower beam, and a lower weight-receiving hanger or pendant extending through the vertical opening and connected with the lower beam, substantially as described.

In testimony that I claim the foregoing as my own I have hereto affixed my signature in the presence of two witnesses.

THOMAS ANDREW KILLMAN.

Witnesses:
JOHN McMAHON,
I. B. SPENCER.